United States Patent [19]

Disam et al.

[11] Patent Number: 5,623,725
[45] Date of Patent: Apr. 22, 1997

[54] PROCESS FOR PRODUCING VERY PURE PLATINUM MATERIALS, SEMI-FINISHED PARTS AND FOILS DISPERSION-REINFORCED WITH Y2O3

[75] Inventors: Joachim Disam, Hahnheim; Gerhard Jangg; Johannes Zbiral, both of Wien; Gerhard Schreier, Wiener; Christian Edtmaier, Wien, all of Germany

[73] Assignee: Schott Glaswerke, Mainz, Germany

[21] Appl. No.: 442,023

[22] Filed: May 16, 1995

[30] Foreign Application Priority Data

May 19, 1994 [DE] Germany .................. 44 17 495.0

[51] Int. Cl.$^6$ .................. B22F 3/14; B22F 9/24
[52] U.S. Cl. .................. 419/19; 419/20; 419/23; 419/32; 419/33; 419/49; 419/60; 75/235; 75/247; 75/392; 75/710
[58] Field of Search .................. 419/19, 20, 23, 419/33, 32, 49, 60; 75/392, 710, 235, 247

[56] References Cited

U.S. PATENT DOCUMENTS

| | | | |
|---|---|---|---|
| 2,636,819 | 4/1953 | Streicher | 75/172 |
| 4,183,746 | 1/1980 | Pearce et al. | 75/234 |
| 4,274,877 | 6/1981 | Collier et al. | 75/252 |
| 5,304,233 | 4/1994 | Awadalla et al. | 75/741 |

FOREIGN PATENT DOCUMENTS

| | | |
|---|---|---|
| 941701 | 1/1949 | France . |
| 7204546 | 9/1973 | France . |
| 1010741 | 6/1957 | Germany . |
| 132673 | 10/1978 | Germany . |
| 2924896 | 8/1989 | Germany . |

*Primary Examiner*—Charles T. Jordan
*Assistant Examiner*—Daniel Jenkins
*Attorney, Agent, or Firm*—Felfe & Lynch

[57] ABSTRACT

Process for producing very pure platinum materials dispersion-reinforced with $Y_2O_3$ and having high strength and extensibility, even in the temperature range >800° C., from platinum powder by mechanical alloying, which comprises the process steps preparing platinum powder of high purity and low particle size of from 2 to 10 μm, introducing and dispersing $Y_2O_3$ particles >1 μm in the platinum powder by milling in a platinum vessel using milling media of zirconium oxide, degassing the milled product under a vacuum of better than $10^{-3}$ mbar and with an increase in temperature to at least 1200° C. in a platinum capsule for a period of up to 48 hours, gastight welding of the evacuated capsule and hot isostatic pressing at 1350° C. and 200 MPa to give blocks of compact dispersion-reinforced platinum having a density of 100%, producing semi-finished parts and foils from these dispersion-reinforced platinum materials, these parts and foils having a platinum purity of at least 99.95%, a tensile strength $R_m$ from 300 to 350 MPa, an extensibility A of 15–25% and a grain stability up to 1400° C.

21 Claims, No Drawings

PROCESS FOR PRODUCING VERY PURE PLATINUM MATERIALS, SEMI-FINISHED PARTS AND FOILS DISPERSION-REINFORCED WITH Y203

The present invention relates to a process for producing very pure platinum materials dispersion-reinforced with $Y_2O_3$ and having high strength and extensibility, even in the temperature range >800° C., from platinum powder by mechanical alloying and to the production of semi-finished parts and foils therefrom.

Dispersion reinforcement is based on the presence of fine (<1 μm), uniformly dispersed particles which are insoluble in the matrix, even at high temperatures.

The reinforcement is caused by various individual mechanisms. The yield point results from a combination of the basic strength of the pure matrix metal, the strengthening by solid solution formation, the contribution of grain size hardening, the hardening contribution of the dislocation density and the hardening contribution of dispersoids.

The degree of reinforcement by dispersoids is dependent on the particle spacing of the dispersoid and accordingly on the particle size and proportion of the dispersoid.

Strength ($R_m$) and elongation (A) are generally related, i.e. high strengths are coupled with lower elongations.

For materials having the same matrix, there exists a "limit curve" for optimum strength/elongation relationships.

Pairs of $R_m$ and A values which lie below this limit curve indicate a non-ideal material microstructure. A "quality factor" can be derived from the $R_m/A$ relationship.

Dispersion-reinforced materials can be produced virtually only by powder-metallurgical processes. The following processes are available for producing dispersion-reinforced materials:

a) Mixing sufficient fine matrix powder with appropriately fine dispersoid powders.

b) Mixing metal salts into the matrix powders and ignition of the powder mixture, with the salts being converted into oxidic dispersoids.

c) Internal oxidation: the base metal of a pulverulent solid solution alloy is ignited, with the base metal being oxidized to give the dispersoid.

d) Mechanical alloying: milling the dispersoids into the pulverulent matrix.

Subsequently, the mixtures thus obtained have to be compacted so that they can be processed into semi-finished parts.

Electrolytic preparation of powder is known from the literature.

To dissolve and purify the Pt metal or Pt scrap, use is here made of a plant based on the principle of membrane electrolysis.

Under particular electrochemical conditions, the membrane is semipermeable to platinum, so that a refining process leading to pure platinum takes place.

The dissolution medium used is dilute hydrochloric acid (1:1).

In such a plant, about 5 kg of platinum metal scrap can be dissolved per day.

The powder preparation is carried out in an electrochemical cell whose anode and cathode spaces are separated by a glass diaphragm. Powder precipitation occurs on the vibrating cathode.

Particle sizes between 5 and 10 μm can be produced using this method.

However, if particle sizes of <5 μm and Pt powder purities of 99.95% are to be achieved, this procedure is not advantageous.

The subject-matter of the invention is the production of dispersion-reinforced platinum materials whose purity and strength satisfy the demanding requirements of the glass industry for these materials for the purpose of making construction elements in contact with glass in the production of technical and optical glasses.

Dispersion-reinforced metals are, as indicated above, metals in whose matrix are embedded finely dispersed, thermally very stable, ceramic particles which lead, especially at high use temperatures, to a significant increase in material strength compared with the unreinforced pure metal.

Research and development in the field of dispersion-reinforced materials has already led to commercial materials in the area of nickel-based or iron-based alloys. The production technology used here is known, but cannot be transferred to platinum materials since it would lead to unacceptable contamination of the material.

For construction elements in contact with glass in the production of special glasses, the use of components made of pure platinum is strived for.

Platinum materials having a high purity are preferred because platinum is the only metal which does not impair the optical properties of the glasses melted therein in respect of transmission and colour.

However, unalloyed platinum can be used only to a limited extent in the glass industry, since its strength at high temperatures, as occur during glass production, is too low.

The conventional methods of strengthening metallic materials, for example solid solution hardening, precipitation hardening and work hardening, cannot be used in the case of platinum materials for components in contact with glass:

work hardening is lost at use temperatures above only 600° C.; solid solution hardening and precipitation hardening are not possible since the alloying elements would have an adverse effect on the glass quality.

Therefore, the use of platinum in construction elements is, owing to its strength, restricted to temperatures below 800° C.

It is an object of the invention to provide a relatively simple process for producing platinum materials which can be used without risk as construction elements at temperatures significantly higher than 800° C., in addition have a purity of >99.90%, tensile strengths of $R_m$>300 MPa and extensibilities A of at least 15%, and which completely satisfy all the other requirements of the glass processor for use in areas in contact with glass in the production of optical glasses.

Furthermore, it is an object of the present invention to provide a process for producing semi-finished parts and foils from this dispersion-reinforced platinum while retaining the material properties.

This object is achieved according to the invention by the features of the process steps specified in the characterizing part of claim 1.

The process of the invention is divided into the sub-steps:

preparation of platinum powders having a high purity and low particle size and also powder-metallurgical processing to give the powder-reinforced semi-finished platinum part.

The starting point for preparing the very fine platinum powder is a hydrochloric acid solution of platinum, as can be obtained, for instance, by electrolytic processes or by dissolving platinum in boiling aqua regia. The process procedure for preparing very fine, high-purity platinum powders from platinum solutions comprises a plurality of substeps which will now be illustrated by way of example.

Preparation of the solution for the precipitation:

The solution is first evaporated until a concentration of about 400 g Pt/l is reached.

If the Pt solution is obtained by dissolving platinum in boiling aqua regia, the oxides of nitrogen have to be completely driven off, which is carried out by repeated addition of small amounts of hydrochloric acid.

The solution is then further evaporated until a boiling temperature of about 180° C. is reached, so that any iridium present is converted into the trivalent form. Only in this form will iridium not precipitate out in the subsequent precipitation step.

If the evaporation of the solution at this temperature is omitted, the precipitation results in an iridium-containing platinum precipitate which does not have the purity required for optical and technical applications even in the further processing to give semi-finished parts according to the technology of the invention.

The Pt concentration of the solution reached on evaporation to a boiling temperature of 180° C. is about 1500 g/Pt/l.

The solution is then, still in the hot state, taken up with $H_2O$ and diluted to 600 g Pt/l. This process step leads to a platinum concentrate which can be stored, i.e. which does not show any decomposition reactions and changes on prolonged storage.

Since the subsequent precipitation is carried out batchwise, the platinum solution has to be able to be stored.

Precipitation procedure

The precipitation is carried out by addition of a Pt solution to an ammonium chloride solution present in a frit while stirring vigorously. This forms a Pt precipitate $(NH_4)_2[PtCl_6]$ according to the following reaction equation:

$$H_2[PtCl_6]+2NH_4Cl \rightarrow (NH_4)_2[PtCl_6]+2HCl$$

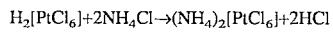

To ensure a high product purity, it is essential that the indicated concentrations and temperatures of the Pt solution and the ammonium chloride ($NH_4Cl$) solution are accurately adhered to:

Pt solution: concentration 150–200 g/l, temperature 80° C.

$NH_4Cl$ solution: concentration 30% (300 g $NH_4Cl/l$), temperature 80° C.

Immediately after the precipitation has been carried out, the reaction liquid is removed by suction as quickly as possible. Owing to the precipitation temperature, the platinum precipitate is relatively coarse, of a yellow-orange colour and is readily filterable. When removing the reaction solution by suction, care must be taken to ensure that no cracks are formed in the filter cake, since otherwise residues of the reaction solution, which can contain impurities, remain in the precipitate.

For the precipitation, during which the platinum is refined, i.e. the impurities are removed and a high-purity starting material for the platinum powder preparation is formed, a frit was constructed which makes it possible to initially charge the ammonium chloride solution and then to add the platinum solution while stirring vigorously with a blade stirrer. This procedure leads to rapid and complete formation of the platinum precipitate, with the coprecipitation of other contaminating metals being avoided. Furthermore, the procedure described permits the preparation of high-purity platinum precipitates. Therefore, platinum scrap which can otherwise only be fed to a refinery can also be converted according to the invention into high-purity platinum powder.

Washing and dewatering the platinum precipitate:

The platinum precipitate is washed using dilute, cold $NH_4Cl$ solution (15% strength≡150 g/l) in a plurality of washing steps.

If the filter cake of platinum precipitate is successfully prevented from drying, the upper front of the reaction liquid migrates uniformly through the filter cake, thus completely removing the impurities.

To prevent dry cracks from forming, care has to be taken to ensure that a certain amount of washing solution always remains over the filter cake. When the washing solution coming through is colourless, the $NH_4Cl$ solution is removed by suction for 15 minutes. The remaining water still present in the filter cake is removed by washing with acetone. When the acetone sucked through has a milky turbidity, the water has been completely removed. Suction is then continued for a further 30 minutes.

Removing the water as completely as possible from the platinum precipitate is of decisive importance, since even small residual amounts interfere in the subsequent thermal decomposition of the precipitate to give platinum powder.

If a water-containing precipitate is thermally decomposed, coarse, matted platinum powders are formed. Furthermore, gas-phase reactions lead to the formation of a platinum mirror on the components of the decomposition furnace, which, on the one hand, leads to increased maintenance requirements and, on the other hand, also substantially increases the platinum losses via the gas phase.

Thermal decomposition:

The thermal decomposition of the precipitated and washed platinum precipitate to give platinum powder is carried out in a muffle furnace having a glass muffle with extraction ports for the gases formed in the decomposition. A glass muffle is necessary since corrosive waste gases are formed, and these prohibit the use of a metal muffle.

The decomposition process commences at 380° C., with an increase in temperature increasing the decomposition rate, but also leading to coarser and matted platinum powders. It is important to set the temperature in such a way that there is obtained a completely decomposed platinum powder which is fine, i.e. has a mean particle size of 2–5 μm, and contains no undecomposed precipitate residues. This is achieved if decomposition temperatures between 380° and 420° C. are adhered to.

At higher temperatures, a significantly coarser platinum powder is obtained, and this is not suitable for further powder-metallurgical processing to give dispersion-reinforced, semi-finished platinum parts.

Washing of the platinum powder:

After the thermal decomposition, the platinum sponge formed from the precipitated platinum precipitate during the decomposition is broken up and boiled a plurality of times with distilled water.

In this process, the platinum sponge disintegrates into a fine powder which completely satisfies the requirements of powder-metallurgical processing to give dispersion-reinforced, semi-finished platinum parts.

The water is then removed with suction and the platinum powder, which is still moist, is dried to constant weight in a drying oven at 100° C.

Introduction and dispersion of the dispersoids:

The introduction and dispersion of the dispersoids according to the invention is carried out by powder milling.

The platinum powders from the above described platinum powder preparation, mixed with $Y_2O_3$, are here milled in a ball mill. This milling process leads to continual further comminution and to rewelding of the powder particles, with, on the one hand, the $Y_2O_3$ dispersoid particles being themselves comminuted and, on the other hand, uniformly and finely dispersed in the platinum powder.

The mill used for milling comprises a platinum vessel which is charged with zirconium oxide balls as milling media. This procedure is necessary, since ball mills made of steel would lead to unacceptable contamination of the milled platinum products with iron. However, it is also not possible to use pure ceramic mills. In milling in a zirconium oxide milling container, high abrasion of zirconium oxide from the container wall occurs. Although this would not have an adverse effect on the glass quality, since the abraded material is milled into the platinum powder in the form of particles larger than 1 μm, it considerably impairs the plasticity of the semi-finished platinum parts.

Therefore, the above described procedure using a milling container of platinum and milling media of zirconium oxide has to be selected. On the one hand, the abrasion from the zirconium oxide balls is very low and, in contrast to the abrasion from ceramic vessels, very fine and thus does not impair the properties of the semi-finished parts; on the other hand, the required purity for optical applications can be ensured by the selected combination of ceramic balls and the platinum container. The milled product obtained in this way is a platinum powder in which finely dispersed $Y_2O_3$ particles are embedded and which is best suited to further processing to give highly heat-resistant semi-finished platinum parts.

Compaction

After milling, the milled products are charged into platinum capsules. The capsules have a port to which a vacuum pump is connected. Application of a vacuum with simultaneous heating of the capsule removes the gases which may have been trapped in the platinum during milling. The degassing requires temperatures of at least 1200° C. with a heat treatment time of up to 48 hours. If this degassing treatment is omitted, gas pores occur at the welded seams during component manufacture when dispersion-reinforced, semi-finished platinum parts are joined, for example, by welding, which gas pores can lead to failure of the construction by weakening the welded seam.

After degassing, the evacuated capsule is welded so as to be gas tight and is hot isostatically pressed at 1350° C. under a pressure of 200 MPa. This gives a compact material which has a relative density of 100% of the theoretical density. The material thus produced can be further formed by conventional forming methods.

According to the invention, 0.2–0.6% by weight, in particular 0.25–0.5% by weight, of $Y_2O_3$ having particle sizes <1 μm, in particular having particle sizes in the region of 20 nm, are mixed into the platinum powder as dispersoid.

The $Y_2O_3$ does not lead to any discolouration of the glasses, as would strengthening alloying elements. Since dispersion-reinforced platinum materials contain no constituents which lead to impairment of the glass quality, they are best suited to high-temperature use in components in contact with glass.

A decisive factor for the strength properties and thus also for the operational reliability when dispersion-reinforced platinum is used in construction components is the distribution of the $Y_2O_3$ dispersoid particles in the platinum matrix. A regular arrangement of very fine particles is desired. The size of these $Y_2O_3$ dispersoid particles should be about 20 nm and their spacing in the platinum matrix should be from 100 to 600 nm, in particular 150–500 nm.

Very damaging are dispersoid particle agglomerates larger than 1 μm, since these agglomerates significantly reduce the plasticity at high temperatures. The operational reliability of the component is then no longer ensured. Dispersion-reinforced platinum materials are offered on the market by various manufacturers, which materials are, however, unsatisfactory in respect of their strength properties. In most cases, the commercially available materials have dispersoid particle agglomerates larger than 1 μm. Strength and plasticity of the materials are thus very considerably reduced and the operational reliability of the components made therefrom is no longer ensured.

According to the invention, semi-finished parts and foils of dispersion-reinforced platinum are produced by rolling the hot isostatically pressed bars. In this procedure, the bars are initially rolled at a temperature of 1200° C. and are hot rolled until the thickness has decreased by 40–50%.

Cold initial rolling of dispersion-reinforced platinum bars leads to the formation of rolling flaws in the interior of the block, in the worst case also to the complete tearing open of the semi-finished product. After a hot reduction of 50%, further forming can be carried out cold. Cold rolling is desired, since the surface quality and the dimensional accuracy of the foils is significantly improved in this way.

The process of the present invention gives a dispersion-reinforced platinum or semi-finished parts and foils made therefrom having a platinum purity of at least 99.95%, with tensile strengths $R_m$ of 300–350 MPa, an extensibility A of 15–25% and a grain stability up to 1400° C.

The dispersion-reinforced platinum materials and semi-finished platinum parts produced by the described method according to the invention meet the purity requirements for platinum which is used as material for construction parts in contact with glass in the production of optical glasses.

The preparation of the platinum powder also does not require pure starting material, since refining is carried out. It is therefore also possible to obtain a highly pure dispersion-reinforced, semi-finished platinum part by reprocessing of scrap platinum items which would otherwise, owing to their contamination, have to be taken out from glass production.

The platinum materials which have been produced in the manner described are suitable for high-temperature use, since they completely retain their strength up to use temperatures of at least 1300° C.

The properties described give, by means of the process of the invention, substantial technical advances and advantages:

High-purity platinum materials which satisfy the requirements in the production of optical and technical glasses are produced.

Unalloyed platinum can be used in construction components which are exposed to temperatures above 1300° C. This region was previously the preserve of platinum alloys which, however, impair the transmission of the glasses and lead to discolouration.

Components which have taken up impurities during use in areas in contact with glass and which had to be taken out of production operation, do not have to be passed to the refinery. In the novel manner described, they can be converted into dispersion-reinforced, semi-finished parts of pure platinum.

Components of dispersion-reinforced platinum which have been taken out of service can be reprocessed by the method of the invention and converted into new dispersion-reinforced, semi-finished parts of pure platinum.

The novel powder-metallurgical processing described to give the semi-finished part guarantees that high quality semi-finished platinum parts are produced, which parts contain no deleterious, plasticity-reducing inclusions. Furthermore, this processing route of the invention produces materials having significantly higher strength at high temperatures than all current commercial products.

The temperature limit for the use of construction components having a pure platinum matrix can be successfully increased from about 800° C. for unreinforced platinum to over 1300° C. for dispersion-reinforced platinum. Dispersion-reinforced platinum which has been produced in the manner of the invention is thus extremely suitable for replacing PtIr or PtRh alloys, which results in a decisive improvement in the molten glasses.

What is claimed is:

1. A process for producing a pure platinum material dispersion-reinforced with $Y_2O_3$ and having high strength and extensibility, even in the temperature range >800° C., from platinum powder, comprising:

(a) providing a high purity platinum powder having a particle size of from 2 to 10 μm;

(b) dispersing $Y_2O_3$ particles having a size of <1 μm in the platinum powder by milling the powder and $Y_2O_3$ particles in a platinum vessel using milling media of zirconium oxide to produce a milled product;

(c) charging the milled product into a platinum capsule and degassing the milled product under a vacuum of at least $10^{-3}$ mbar at a temperature of at least 1200° C. for a period of up to 48 hours;

(d) welding the evacuated capsule to form a gastight capsule; and, (e) hot isostatic pressing the gastight capsule to form a material of compact dispersion-reinforced platinum having a density of 100%.

2. The process of claim 1, wherein 0.2 to 0.6% by weight of $Y_2O_3$ is dispersed into the platinum powder.

3. The process of claim 2 wherein the $Y_2O_3$ particles have a size of about 20 nanometers.

4. The process of claim 2 wherein 0.25 to 0.5% by weight of $Y_2O_3$ is dispersed into the platinum powder.

5. The process of claim 4 wherein the $Y_2O_3$ particles have a size of about 20 nanometers.

6. The process of claim 1 wherein the gastight capsule is hot isostatically pressed to form a block or bar.

7. The process of claim 1 wherein the hot isostatic pressing is at a temperature of about 1350° C. and pressure of about 200 MPa.

8. A process for producing a semi-finished article of a dispersion-reinforced platinum material comprising (a) providing a high purity platinum powder having a particle size of from 2 to 10 μm;

(b) dispersing $Y_2O_3$ particles having a size of <1 μm in the platinum powder by milling the powder and $Y_2O_3$ particles in a platinum vessel using milling media of zirconium oxide to produce a milled product;

(c) charging the milled product into a platinum capsule and degassing the milled product under a vacuum of at least $10^{-3}$ mbar at a temperature of at least 1200° C. for a period of up to 48 hours;

(d) welding the evacuated capsule to form a gastight capsule;

(e) hot isostatic pressing the gastight capsule at 1350° C. and 200 MPa to form a material of compact dispersion-reinforced platinum having a density of 100%;

(f) hot rolling the hot isostatically pressed material at a temperature of 1200° C. until the thickness has decreased by 40–50%; and (g) subsequently, after a hot reduction of 50%, further formed cold, in particular rolled out to give foils.

9. The process of claim 8 wherein the semi-finished article is a part or foil.

10. A semi-finished article produced according to the process of claim 8 wherein the platinum has a purity of at least 99.95%, the article has a tensile strength $R_m$ of 300–350 MPa, an extensibility A of 15–25% and a grain stability up to 1400° C.

11. The semi-finished article of claim 10 wherein the $Y_2O_3$ dispersed particles in the platinum matrix are spaced at 100–600 nanometers.

12. The semi-finished article of claim 11 wherein the $Y_2O_3$ particles are spaced in the platinum matrix at 150–500 nanometers.

13. The semi-finished article of claim 10 wherein the article is a part or foil.

14. The semi-finished article of claim 11 wherein the article is a part or foil.

15. The semi-finished article of claim 14 wherein the article is a part or foil.

16. A process for preparing a high purity finely divided platinum powder comprising:

(a) dissolving platinum in hydrochloric acid or boiling aqua regia to form a solution;

(b) evaporating the solution to a concentration of about 400 g Pt/l;

(c) further evaporating the solution up to a boiling temperature of about 180° C. to a platinum concentration of about 1500 g Pt/l;

(d) taking up the hot solution of (c) with $H_2O$ to dilute the solution to a concentration of about 600 g Pt/l;

(e) cooling the platinum solution of (d) to a temperature of 80° C. and adjusting the solution to a concentration of 150–200g Pt/l;

(f) adding the cooled and adjusted solution with vigorous stirring to a 30% strength ammonium chloride solution (300 g $NH_4Cl/l$) present in a frit and at a temperature of 80° C.;

(g) precipitating platinum as $(NH_4)_2[PtCl_6]$ and suctioning off remaining reaction liquid to obtain a filter cake;

(h) washing the filter cake a plurality of times with dilute cold $NH_4Cl$ solution and maintaining the filter cake in a moist condition until the washing solution emerges colorless; then (i) drying the washed filter cake by applying suction at a low pressure;

(j) removing residual water from the filter cake of step (i) with acetone until the acetone emerges with a milky turbidity;

(k) drying the filter cake at a low pressure;

(l) thermally decomposing the dried filter cake in a furnace at 380°–420° C. to form a platinum sponge;

(m) pulverizing the platinum sponge to give a fine platinum powder;

(n) boiling the fine platinum powder with distilled water a plurality of times;

(o) removing the water with suction and subsequently drying the powder to constant weight.

17. The process of claim 16 wherein the platinum is dissolved in aqua regia and the oxides of nitrogen are removed by adding hydrochloric acid a plurality of times.

18. The process of claim 16 wherein the filter cake of step (g) is washed three times and the cold $NH_4Cl$ solution is at about 15% strength.

19. The process of claim 16 wherein in step (i) the washed filter cake is dried by applying suction for about 15 minutes at a pressure of about 20 mbar.

20. The process of claim 16 wherein the drying of step (k) is for about 30 minutes at a pressure of about 20 mbar.

21. The process of claim 16 wherein the platinum sponge is pulverized to give a fine powder having a particle size of 1 to 5 µm and the fine powder is dried at about 100° C. to constant weight.

* * * * *